I. C. HORST.
ROTARY WEEDER.
APPLICATION FILED FEB. 28, 1916.
1,244,982.
Patented Oct. 30, 1917.
2 SHEETS—SHEET 1.
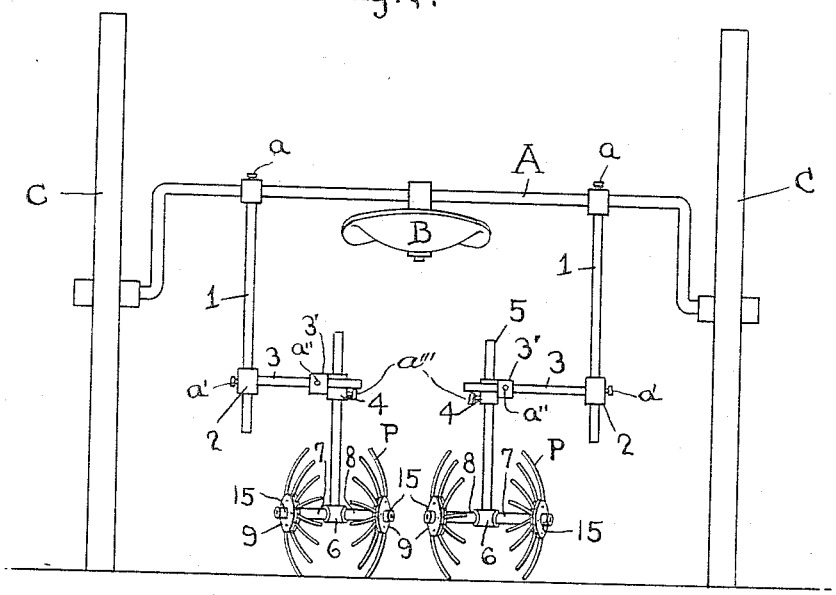
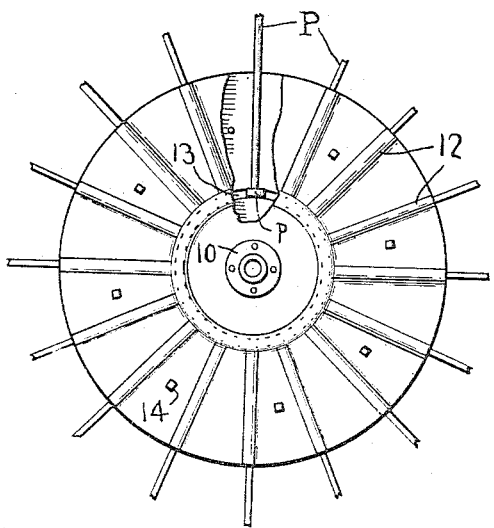
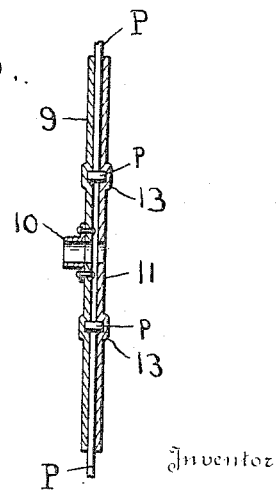
Witnesses
L. B. James
M. R. Bishop
Inventor
Ira C. Horst
By Geo. W. Sues
Attorney Ira C. Horst

UNITED STATES PATENT OFFICE.

IRA C. HORST, OF COLUMBIANA, OHIO.

ROTARY WEEDER.

1,244,982.

Specification of Letters Patent.

Patented Oct. 30, 1917.

Application filed February 28, 1916. Serial No. 80,907.

*To all whom it may concern:*

Be it known that I, IRA C. HORST, a citizen of the United States, and a resident of Columbiana, in the county of Columbiana and State of Ohio, have invented certain new and useful Improvements in Rotary Weeders, of which the following is a specification, reference being had to the accompanying drawings.

This invention relates to a rotary weeder, and the primary object of the invention is to provide a weeder having a plurality of rotating resilient weeder prongs which can be so set as to work lengthwise of the row or toward the growing plants.

Another object is to provide a rotary weeder including oppositely positioned weeding members which rotate upon adjustably held shafts secured in divergent spaced relation.

A still further object is to provide a shovel cultivator with a rotary weeder attachment.

Another object is to provide a rotary weeder with curved, flexible prongs, held to an adjustably secured disk.

Another object is to provide a rotating flexible prong, mounted and adjustably held on a disk, cylinder, or a drum.

A further object is to provide a rotary weeder of a simple and inexpensive nature, and of a compact and durable construction, having oppositely positioned weeding members including curved resilient teeth so arranged that the trash and weeds removed from the soil will readily slide off of the prongs and not hinder the free operation of the weeding members or interfere with the growing plants.

With these and other objects in view the present invention consists in the combination and arrangement of parts as will be hereinafter more fully described and finally pointed out in the appended claims, it being further understood that changes in the specific structure shown and described may be made within the scope of the claims without departing from the spirit of the invention.

In the accompanying drawings forming a part of this specification, and in which like numerals of reference indicate similar parts in the several views:—

Figure 1 shows an elevational view of a rotary weeder embodying my invention.

Fig. 2 shows an enlarged detached detail with parts broken away of one of the weeding members.

Fig. 3 is a transverse sectional view of Fig. 2.

Figure 4:
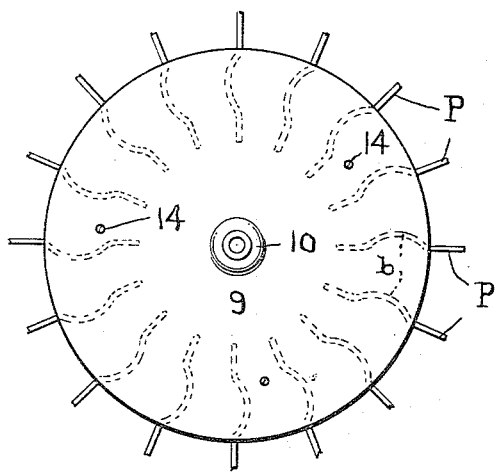
Fig. 4 shows a modification wherein the weeding prongs are shown with curved portions preventing the removal of the prongs.
Figure 5:
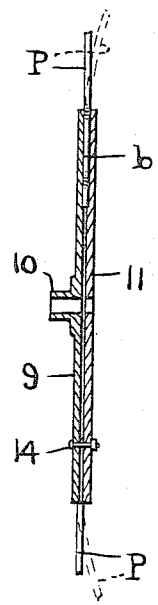
Fig. 5 is a transverse sectional view of Fig. 4.

The results desired in an effective weeder are to stir the soil in such a manner as to fully uncover the roots of the young weeds and thus expose their roots to the sun and air thereby causing them to wither and dry. The weeding prongs must be so actuated, however, as not to collect or carry along the rubbish as this would result in the young plants being injured or destroyed.

In my present invention, I provide a rotary weeder having curved flexible prongs which by their rotary motion free themselves automatically of any adhering trash or vegetation.

In the accompanying drawings, A designates a suitable axle, C are two suitable supporting wheels, a seat B being shown as secured to the axle A.

Slidably and adjustably secured to the axle A are the hangers 1, these hangers being secured to the axle and held in adjusted position by means of the bolts $a$. Vertically adjustable and revolubly held upon these hangers 1 are the bracket arms 3 having the heads 2 engaging the hangers 1, these heads being secured by means of suitable bolts $a'$. Slidably and revolubly held in turn upon each bracket arm 3 is a sleeve collar 3' secured by means of a bolt $a''$, having a sleeve 4, and revolubly held within each sleeve 4 is a stem 5, each stem being secured by means of a suitable bolt $a'''$. As shown in Fig. 2, the hangers are oppositely positioned and held in parallel spaced relation.

Secured to the lower end of each stem 5 is a head 6 from which extend in divergent spaced relation two similar shafts, the outer shaft being marked 7, and the inner shaft being marked 8.

Rotatably held to the end of each shaft 7 is a weeding member comprising two disks which are arranged to adjustably hold a plurality of curved resilient prongs P. As disclosed in Fig. 2 each prong P ends in a square head *p*. The lower end of each prong is straight while the major portion of each prong is curved as shown in Fig. 1. The straight stem portion of each prong P is held within a suitable corrugation 12 formed within the disks 9 and 11, forming the carrying members. As shown each disk 9 is provided with a hub 10 these hubs being revolubly held upon the shafts 7 and 8. These shafts 7 and 8 are each provided with a stop collar 15 preventing outward movement of the rotating weeding members.

By reason of the arrangement of the parallel extending and adjustably held members 1 and 5 and the adjustably held bracket arms 3 the rotating weeding members can be set so as to work lengthwise of the row or transversely toward the growing plants, the construction permitting the weeding elements being readily adjusted to meet all conditions. This arrangement further permits the weeding elements being carried toward one another or away from one another and also permits their being given any vertical adjustment, this regulating the depth the teeth are to enter the soil in removing the weeds.

While I have shown the weeding members as revolving through the earth through the forward motion of the machine, if desired a positive rotary movement could be imparted to the weeding members.

It is of course understood that these weeders are made in different sizes to meet the different conditions. The weeder further is simple and inexpensive in construction, and both durable and efficient in operation.

Having thus described my said invention, what I claim as new and desire to secure by U. S. Letters Patent is:—

1. A weeder including in combination a suitable support, a hanger radially and longitudinally adjustable on to said support, a bracket arm revolubly and slidably adjustable on said hanger, a collar revolubly and slidably adjustable on said bracket arm and having a sleeve, a stem revolubly and slidably held within said sleeve, two divergently held shafts secured to the lower end of said stem, and a weeding member including resilient prongs, revolubly held on each shaft.

2. A rotary weeder including a wheel supported axle, oppositely positioned adjustably held depending hangers thereon, a bracket arm adjustably secured to each hanger said bracket arms being directed toward one another, a collar adjustably secured to each bracket arm, each collar having a sleeve, a stem adjustably secured within each sleeve, each stem ending in a head, two divergently extending shafts held to each head, and a weeding member revolubly secured to each shaft each comprising a plurality of resilient curved teeth all arranged as and for the purpose set forth.

In testimony whereof I affix my signature, in the presence of two witnesses.

IRA C. HORST.

Witnesses:
H. W. HAMMOND,
HAZEL ROLLER.